Patented Aug. 5, 1941

2,251,287

UNITED STATES PATENT OFFICE 2,251,287

SUBSTITUTED CINNAMIC ACID ESTERS AND AMIDES

William A. Lott, East Orange, N. J., assignor to E. R. Squibb & Sons, New York, N. Y., a corporation of New York No Drawing. Application September 16, 1938, Serial No. 230,201

6 Claims. (Cl. 260—477)

This invention relates to, and has for its object the provision of, certain cinnamic acid derivatives.

The compounds embraced by this invention comprise bases of the general formula

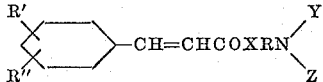

wherein R represents alkylene (especially lower alkylene) or substituted alkylene, R' and R" each represent alkoxy or jointly represent —O—alkylene—O—, X represents —O— or —NH—, and Y and Z represent alkyl (especially lower alkyl) or aralkyl; and the acid-addition salts thereof. These compounds are characterized by valuable local-anesthetic properties. They may be prepared by causing the appropriate acyl halide to react with the appropriate amino-alcohol or diamine—to form the ester or amide, respectively—or those that are esters may be formed by causing the alkali-metal salt of the appropriate acid to react with the appropriate amino-alkyl halide.

The following examples are illustrative of the invention:

EXAMPLE 1

*Gamma-diethylamino-propyl 3,4-dimethoxy-cinnamate hydrochloride*

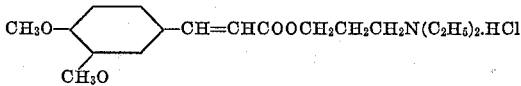

A mixture of 9 g. of 3,4-dimethoxy cinnamic acid and 15.5 g. of thionyl chloride is refluxed for three hours, after which any excess of thionyl chloride is removed by distillation in vacuo at the temperature of the steam bath. Cooling the solution effects a precipitation of the acyl chloride, which is then separated out by filtration.

A solution of 4.2 g. of gamma-diethylamino-propyl alcohol in 50 cc. of anhydrous benzene is refluxed with the acyl chloride for two hours; after a day or so, a yellow crystalline substance precipitates out and is separated by filtration; then washing the precipitate with benzene, recrystallizing it from acetone, and then from alcohol and ether, yields the desired compound as transparent, lustrous crystals, slightly streaked with a brown coloration, and having a melting point of 147–148.5° C.

After dissolving this compound in water and alkalinizing, the free base is extracted with ether; the ethereal solution is thoroughly dried over fused potassium carbonate and neutralized with a solution of hydrochloric acid, whereupon the hydrochloride separates out as water-soluble light-yellow crystals, which, after recrystallization from benzene and then acetone, have a melting point of 147–149° C.

EXAMPLE 2

*β-diethylamino-ethyl 3,4-methylene-dioxy-cinnamate hydrochloride*

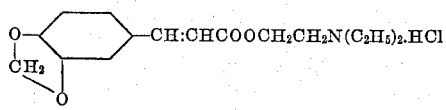

A solution of 3,4-methylene-dioxy-benzaldehyde (piperonal) is treated with ethyl acetate, and the resultant ester, after hydrolysis, is converted to the corresponding acyl chloride by reaction with thionyl chloride; the acyl chloride, upon being treated with β-diethylamino-ethyl alcohol, yields the desired compound.

EXAMPLE 3

*N-(β-diethylamino-ethyl) - 3,4 -methylene-dioxy-cinnamide*

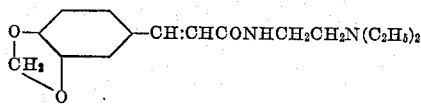

The acyl chloride of Example 2, when treated with unsymmetrical diethyl-ethylenediamine, yields the desired compound.

The following are further exemplificative compounds which may be produced by substituting the appropriate reactants in the foregoing examples:

4. Gamma-(N-methyl - N-ethyl-amino) -β-hydroxy-propyl 3,4-dimethoxy cinnamate hydrochloride.

5. N-[β-(N-propyl - N - benzyl-amino) -ethyl]- 3,4-dimethoxy-cinnamide.

The bases of this invention may be converted into acid-addition salts generally—inter alia the hydrochloride, sulfate, borate, nitrate, lactate, tartrate, citrate, phosphate, and picrate—by methods well known in the art, e. g. by dissolving the base in ether or other suitable organic solvent, adding an equivalent amount of the acid, and evaporating the solution until crystallization ensues or until completely dry.

The invention may be variously otherwise embodied, within the scope of the appended claims.

I claim:

1. Compounds selected from the group consisting of bases of the general formula

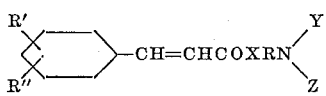

wherein R represents a member of the group consisting of alkylene and hydroxy-substituted alkylene, R' and R'' represent a member of the group consisting of individual alkoxy radicals and joint —O—alkylene—O— radicals, X represents a member of the group consisting of —O— and —NH—, and Y and Z are each a member of the group consisting of alkyl and aralkyl; and the acid-addition salts thereof.

2. Compounds of the general formula

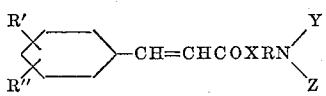

wherein R represents a member of the group consisting of alkylene and hydroxy-substituted alkylene, R' and R'' represent a member of the group consisting of individual alkoxy radicals and joint —O—alkylene—O— radicals, X represents a member of the group consisting of —O— and —NH—, and Y and Z are each a member of the group consisting of alkyl and aralkyl.

3. Dialkylamino-alkyl amides of substituted cinnamic acids of the general formula

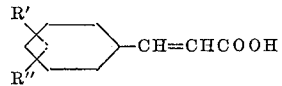

wherein R' and R'' represent a member of the group consisting of individual alkoxy radicals and joint —O—alkylene—O— radicals 4. Gamma-diethylamino-propyl 3,4-dimethoxy-cinnamate hydrochloride.

5. N-(β-diethylamino-ethyl)-3,4-methylene-dioxy-cinnamide.

6. N-[β-(N-propyl - N - benzyl-amino)-ethyl]-3,4-dimethoxy-cinnamide.

WILLIAM A. LOTT.